United States Patent
Shin et al.

(10) Patent No.: US 11,895,224 B2
(45) Date of Patent: Feb. 6, 2024

(54) CRYPTO PROCESSOR, METHOD OF OPERATING CRYPTO PROCESSOR, AND ELECTRONIC DEVICE INCLUDING CRYPTO PROCESSOR

(71) Applicant: SAMSUNG ELECTRONICS CO., LTD, Suwon-si (KR)

(72) Inventors: Youngsam Shin, Hwaseong-si (KR); Sunmin Kwon, Seoul (KR); Dong-Hoon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 17/233,701

(22) Filed: Apr. 19, 2021

(65) Prior Publication Data

US 2022/0182220 A1    Jun. 9, 2022

(30) Foreign Application Priority Data

Dec. 3, 2020  (KR) .................. 10-2020-0167378

(51) Int. Cl.
*H04L 9/06* (2006.01)
*G06F 7/523* (2006.01)
(Continued)

(52) U.S. Cl.
CPC ............ *H04L 9/0637* (2013.01); *G06F 7/523* (2013.01); *G06F 7/724* (2013.01); *H04L 9/008* (2013.01); *H04L 2209/12* (2013.01)

(58) Field of Classification Search
CPC ..... H04L 2209/12; H04L 9/0637; H04L 9/08; H04L 9/0822; G06F 21/72; G06F 21/602;
(Continued)

(56) References Cited

U.S. PATENT DOCUMENTS 7,010,738 B2 * 3/2006 Morioka ............. H03M 13/158
708/492
9,425,823 B1 * 8/2016 Karabed .......... G11B 20/00007
(Continued)

FOREIGN PATENT DOCUMENTS

KR         10-2040120 B1    11/2019
KR      10-2020-0070090 A    6/2020

OTHER PUBLICATIONS

Riazi et al. "HEAX: High-Performance Architecture for Computation on Homomorphically Encrypted Data in the Cloud" [Online], Sep. 20, 2019 [Retrieved on: May 19, 2023], Cornell University, www.arxiv.org, Retrieved from: < https://arxiv.org/vc/arxiv/papers/1909/1909.09731v1.pdf > (Year: 2019).*
(Continued)

*Primary Examiner* — Eric W Shepperd
(74) *Attorney, Agent, or Firm* — NSIP Law (57) ABSTRACT

A crypto processor, a method of operating a crypto processor, and an electronic device including a crypto processor. A method of operating a crypto processor for performing a polynomial multiplication of lattice-based texts includes transferring coefficients of polynomials for the polynomial multiplication to multipliers, performing multiplications for a portion of the coefficients in parallel using the multipliers, performing an addition for a portion of results of the multiplications using an adder, and determining a result of the polynomial multiplication based on another portion of the results of the multiplications and a result of the addition.

19 Claims, 8 Drawing Sheets

(51) Int. Cl.
*G06F 7/72* (2006.01)
*H04L 9/00* (2022.01)

(58) Field of Classification Search
CPC ........ G06F 17/156; G06F 7/501; G06F 7/724; G06F 7/523
See application file for complete search history.

(56) References Cited

U.S. PATENT DOCUMENTS

| | | | |
|---|---|---|---|
| 10,382,194 B1 | 8/2019 | Miller et al. | |
| 10,644,877 B2 | 5/2020 | Khedr et al. | |
| 2006/0190518 A1* | 8/2006 | Ekner | G06F 7/57 708/523 |
| 2007/0050442 A1* | 3/2007 | Takagi | G06F 7/722 708/492 |
| 2009/0006511 A1* | 1/2009 | Ozturk | G06F 7/724 708/492 |
| 2009/0136022 A1* | 5/2009 | Langendoerfer | G06F 7/5324 708/232 |
| 2012/0246526 A1* | 9/2012 | Dror | H03M 13/3707 714/704 |
| 2013/0216044 A1* | 8/2013 | Gentry | H04L 9/008 380/277 |
| 2013/0329883 A1* | 12/2013 | Tamayo-Rios | H04L 9/008 380/28 |
| 2018/0375639 A1* | 12/2018 | Lauter | H04L 9/008 |
| 2019/0205875 A1 | 7/2019 | Gulak et al. | |
| 2020/0082738 A1 | 3/2020 | Poeppelmann | |
| 2021/0279040 A1* | 9/2021 | Yonemura | G06F 7/725 |

OTHER PUBLICATIONS

Turan et al. "HEAWS: An Accelerator for Homomorphic Encryption on the Amazon AWS FPGA" [Online], Jul. 9, 2020 [Retrieved on: Mar. 19, 2023], www.ieee.org, Retrieved from: < https://ieeexplore.ieee.org/stamp/stamp.jsp?tp=&arnumber=9072637 > (Year: 2020).*

Du et al.,"High-Speed Polynomial Multiplier Architecture for Ring-LWE Based Public Key Cryptosystems" [Online], May 20, 2016 [Retrieved on: May 26, 2023], www.acm.org, Retrieved from: < https://dl.acm.org/doi/pdf/10.1145/2902961.2902969 > (Year: 2016).*

Nejatollahi, Hamid, et al., "Exploring Energy Efficient Quantum-resistant Signal Processing Using Array Processors", IEEE International Conference on Acoustics, Speech and Signal Processing (ICASSP). IEEE, 2020. (5 pages in English).

Tan, Weihang, et al., "An Ultra-Highly Parallel Polynomial Multiplier for the Bootstrapping Algorithm in a Fully Homomorphic Encryption Scheme", Journal of Signal Processing Systems 93.6 (2021): 643-656.

Extended European search report dated Jan. 20, 2022, in counterpart European Patent Application No. 21188188.3 (8 pages in English).

* cited by examiner

CRYPTO PROCESSOR, METHOD OF OPERATING CRYPTO PROCESSOR, AND ELECTRONIC DEVICE INCLUDING CRYPTO PROCESSOR

CROSS-REFERENCE TO RELATED APPLICATIONS

This application claims the benefit under 35 USC § 119(a) of Korean Patent Application No. 10-2020-0167378 filed on Dec. 3, 2020, in the Korean Intellectual Property Office, the entire disclosure of which is incorporated herein by reference for all purposes.

BACKGROUND

1. Field

The following description relates to a crypto processor, a method of operating the same, and an electronic device including the same.

2. Description of Related Art

Homomorphic encryption is an encryption scheme that enables an arbitrary logical operation or a mathematical operation to be performed on encrypted data. Homomorphic encryption does not require decryption for data processing, thereby maintaining security for data processing. Homomorphic encryption allows encrypted information to be transmitted to a server without risk of data privacy intrusion or extortion, to use various services.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a crypto processor for performing a polynomial multiplication of lattice-based texts includes transferring coefficients of polynomials for the polynomial multiplication to multipliers, performing multiplications for a portion of the coefficients in parallel using the multipliers, performing an addition for a portion of results of the multiplications using an adder, and determining a result of the polynomial multiplication based on another portion of the results of the multiplications and a result of the addition.

The portion of the results of the multiplications may be obtained by a portion of the multipliers and transmitted to the adder through internal data paths respectively connecting the portion of the multipliers to the adder.

The performing of the multiplications may include performing, in parallel, a multiplication between a first polynomial coefficient of a first text and a third polynomial coefficient of a second text, among the multiplexed coefficients, a multiplication between a second polynomial coefficient of the first text and the third polynomial coefficient, a multiplication between the first polynomial coefficient and a fourth polynomial coefficient of the second text, and a multiplication between the second polynomial coefficient and the fourth polynomial coefficient.

The performing of the addition may include performing an addition for a result of the multiplication between the second polynomial coefficient and the third polynomial coefficient and a result of the multiplication between the first polynomial coefficient and the fourth polynomial coefficient.

The determining may include determining the result of the polynomial multiplication based on a result of the multiplication between the first polynomial coefficient and the third polynomial coefficient, a result of the addition, and a result of the multiplication between the second polynomial coefficient and the fourth polynomial coefficient.

The method may further include receiving an instruction for the execution of the polynomial multiplication and the coefficients, wherein the transmitting may be performed in response to receiving the instruction.

The receiving may include receiving coefficients of the same degree among the coefficients of the polynomials.

Each of the texts may be a plaintext in which a message to be delivered is encoded or a ciphertext in which plaintext is encrypted.

The method may further include controlling an operation mode of the crypto processor, wherein the performing of the addition may be performed in response to the operation mode being a first mode, multiplications may be performed by transmitting the same coefficient corresponding to each of the multipliers to the multipliers in response to the operation mode being a second mode, and multiplications may be performed by transmitting different coefficients to the multipliers in response to the operation mode being a third mode.

Each of the texts may be expressed by polynomials.

The polynomials expressing each of the texts may include a first polynomial corresponding to a message, and a second polynomial corresponding to an encrypt key related to encryption and/or decryption of a ciphertext corresponding to the message.

The polynomials may be transformed through number-theoretic transform (NTT), and each of the multiplications for the portion of the coefficients may be performed as a point-wise multiplication.

The method may include multiplexing the coefficients of the polynomials for the polynomial multiplication prior to transferring to the coefficients to the multipliers.

In another general aspect, a crypto processor for performing a polynomial multiplication of lattice-based texts includes input registers configured to store coefficients of polynomials for the polynomial multiplication, multipliers configured to perform multiplications for a portion of the coefficients in parallel, an adder configured to perform an addition for a portion of results of the multiplications, and output registers configured to store another portion of the results of the multiplications and a result of the addition, wherein a result of the polynomial multiplication may be determined based on the other portion of the results of the multiplications and the result of the addition.

In another general aspect, an electronic device includes a memory configured to store coefficients of polynomials for a polynomial multiplication, and a crypto processor configured to multiplex the coefficients and transmit the multiplexed coefficients to multipliers, perform multiplications for a portion of the multiplexed coefficients in parallel using the multipliers, perform an addition for a portion of results of the multiplications using an adder, and determine a result of the polynomial multiplication based on another portion of the results of the multiplications and a result of the addition.

In another general aspect, an electronic device includes one or more processors configured to encrypt a first plaintext to a first ciphertext, which is expressed by a first polynomial including the first message and a second polynomial including a first encrypt key; encrypt a second plaintext to a second ciphertext, which is expressed by a third polynomial including the second message and a fourth polynomial including a second encrypt key; perform four parallel multiplications using the first polynomial, the second polynomial, the third polynomial, and the fourth polynomial to output four multiplication results; perform an addition operation on two of the four multiplication results to output an addition result; and perform a polynomial multiplication of the first ciphertext and the second ciphertext using the addition result and two of the four multiplication results not used in the addition operation.

The one or more processors may be configured to encode a first message to the first plaintext expressed in the form of polynomials and encode a second message to the second plaintext expressed in the form of polynomials.

The one or more processors may be configured to output the two of the four multiplication results directly to an adder through an internal data path, and the adder is configured to output the addition result.

The one or more processors may be configured to receive a quad multiplication addition (QMAD) instruction and perform the polynomial multiplication of the first ciphertext and the second ciphertext based on the QMAD instruction.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

Figure 1:
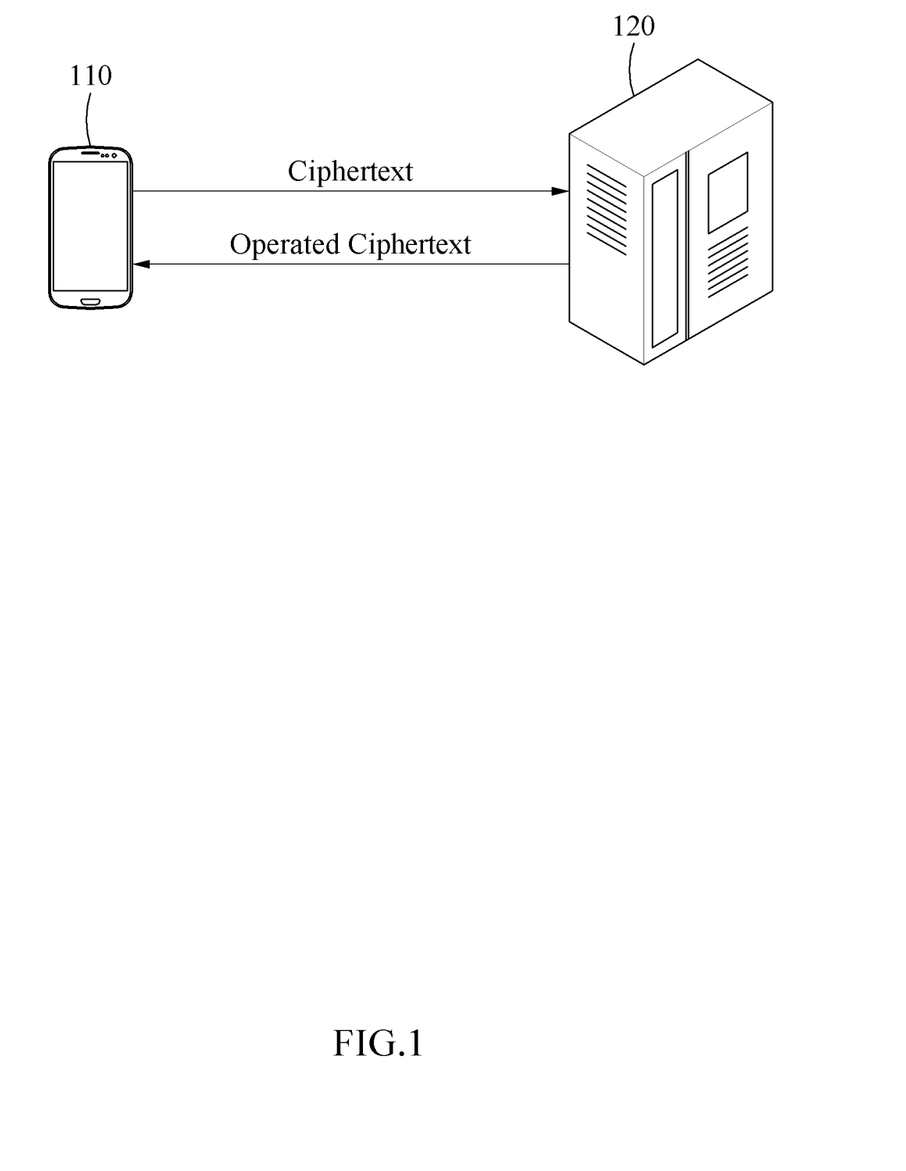
FIG. 1 illustrates an example of the operation of a user terminal and a server for processing a ciphertext based on homomorphic encryption.

FIG. 1 illustrates an example of the operation of a user terminal and a server for processing a ciphertext based on homomorphic encryption.

Referring to FIG. 1, a user terminal 110 and a server 120 are shown. The user terminal 110 is a device controlled by a user, and may include, for example, various computing devices such as a smart phone, a tablet, a laptop, and a personal computer, various wearable devices such as a smart watch and smart glasses, various home appliances such as a smart speaker, a smart television (TV), and a smart refrigerator, a smart vehicle, a smart kiosk, an Internet of Things (IoT) device, a drone, a robot, and the like. The user terminal 110 may encrypt data for information protection and transmit the encrypted data to the server 120 to use various services provided by the server 120. For the server 120 to process the encrypted data, the data to be transmitted to the server 120 may be encrypted based on homomorphic encryption. Herein, encrypted data may be referred to as ciphertext, and not-encrypted data may be referred to as plaintext.

Homomorphic encryption may be an encryption scheme that allows computation on encrypted data without decryption. In other words, homomorphic encryption is an encryption technique for deriving, when performing various operations on the encrypted data and decrypting the data, a result the same as the operation result for not-encrypted data. Since the data are encrypted, the data may not be exposed even if a hacker succeeds in data extortion. Further, the encrypted data may be processed without decryption. Thus, homomorphic encryption may be suitable for various applications that process data requiring privacy protection.

Homomorphic encryption contains noise, and the noise level may increase as an operation on a ciphertext is performed. In order to prevent noise from overwhelming the data, noise processing, that is, bootstrapping to refresh the noise may be performed. Through bootstrapping, the parameter size and computation overhead may be fixed regardless of circuit depth.

A ciphertext encrypted by homomorphic encryption has the maximum number of possible operations without bootstrapping, and the maximum number of possible operations may be denoted by a level l (0≤l≤L). Bootstrapping may be a process of generating a level-L ciphertext having the same message by refreshing a level-0 ciphertext on which an operation is not performable any further.

The server 120 may perform various operations on the ciphertext through bootstrapping. Since decryption of the ciphertext is not required for this, privacy is not invaded. The ciphertext operated by the server 120 may be transmitted back to the user terminal 110, and the user terminal 110 may provide data obtained by decrypting the ciphertext to the user or use the data for a subsequent operation.

Figure 2:
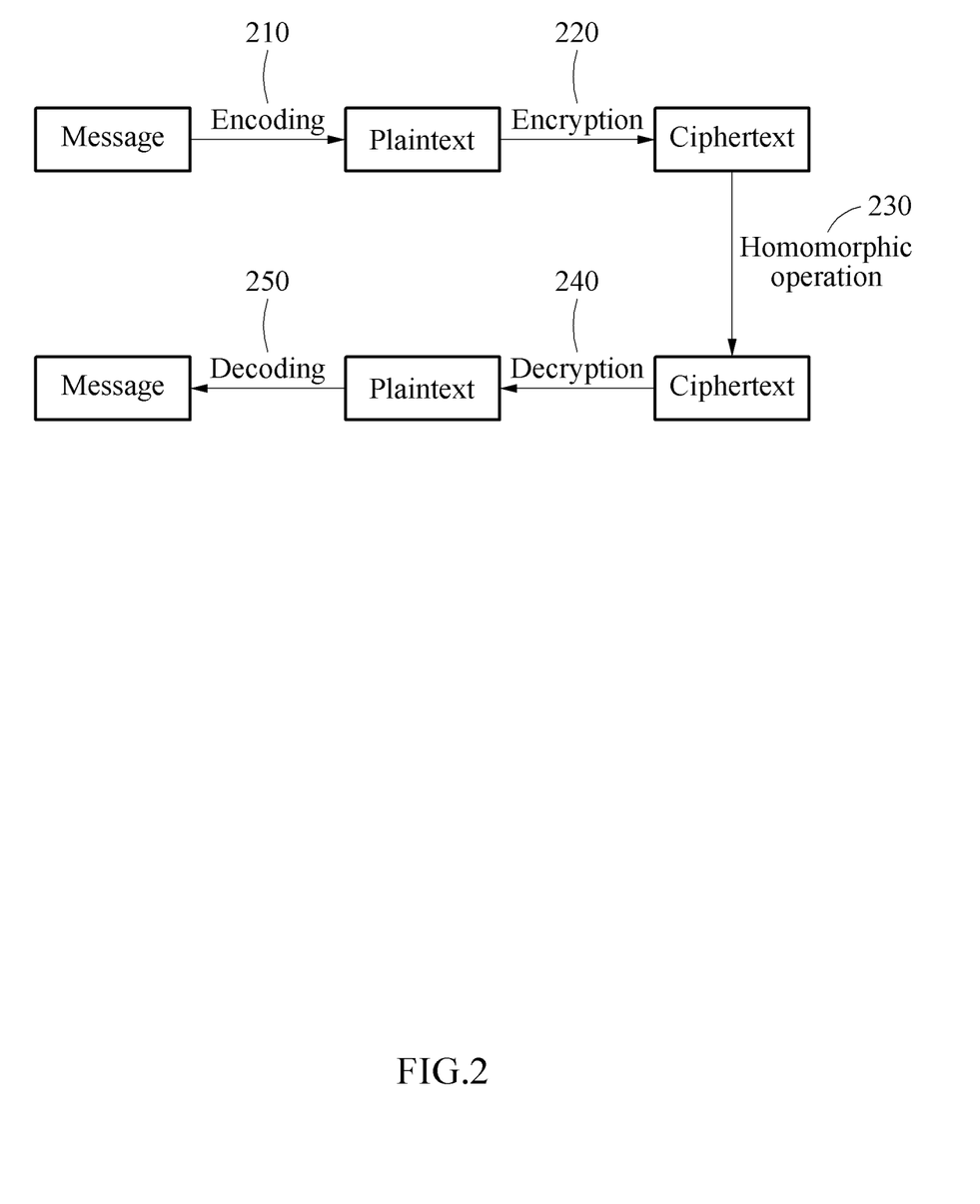
FIG. 2 illustrates an example of a homomorphic operation.
Figure 3:
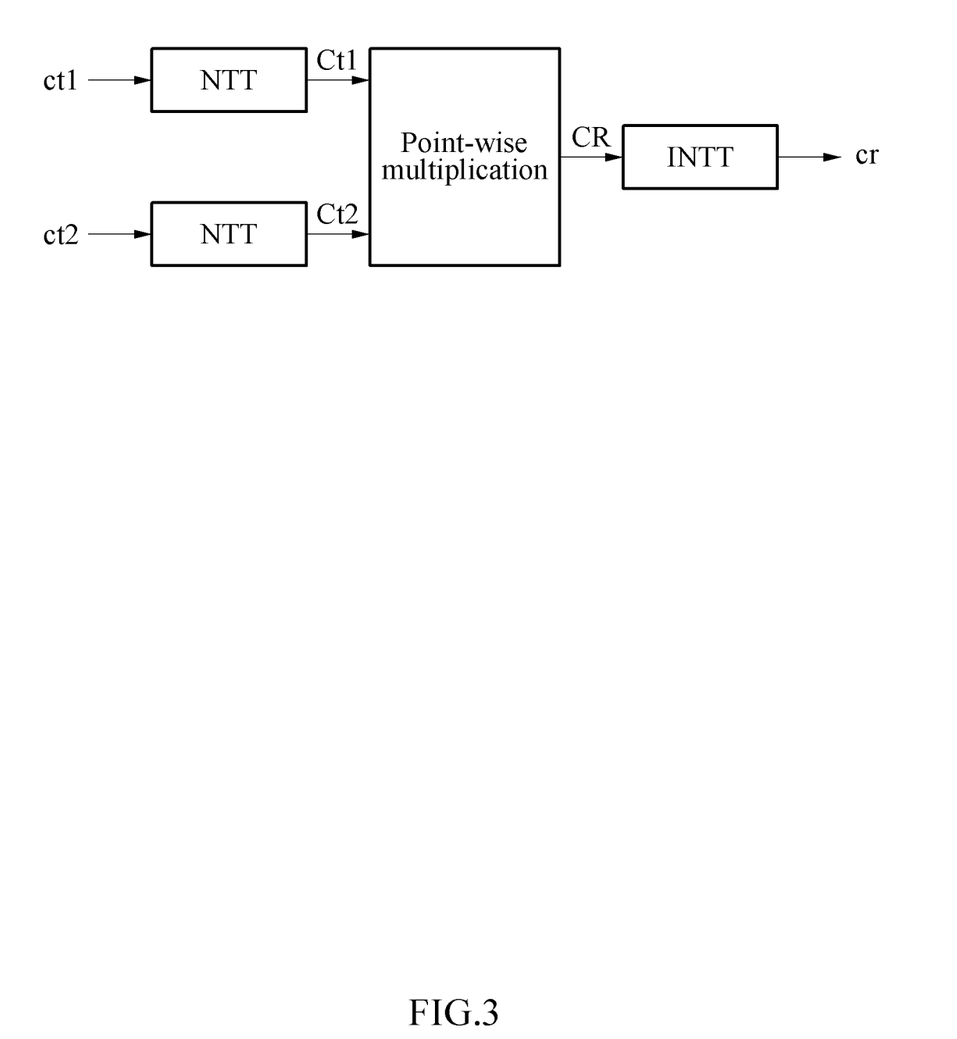
FIG. 3 illustrates an example of a homomorphic operation.

FIGS. 2 and 3 illustrate examples of a homomorphic operation.

Referring to FIG. 2, data processing according to homomorphic encryption is illustrated.

In operation 210, a message including information may be encoded to a plaintext expressed in the form of polynomials. In operation 220, the plaintext may be encrypted to a ciphertext. In lattice-based encryption (e.g., ring learning with errors (Ring-LWE)-based homomorphic encryption), the ciphertext generated by encrypting the plaintext containing the message may be expressed by a first polynomial including the message and a second polynomial including an encrypt key. The message may include information to be delivered, and the encrypt key may include a value to be used to encrypt and/or decrypt the message. The number of polynomials constituting the ciphertext may be referred to as the size of the ciphertext. For example, when the ciphertext is expressed by the first polynomial and the second polynomial as described above, the size may be "2". The two polynomials expressing the ciphertext may be expressed as (n−1)-degree polynomials including n coefficients smaller than a modulus q.

$$A(x) = a_{n-1}X^{n-1} + a_{n-2}X^{n-2} + \ldots + a_0X^0$$

$$B(x) = b_{n-1}X^{n-1} + b_{n-2}X^{n-2} + \ldots + b_0X^0 \quad \text{[Equation 1]}$$

In operation 230, a homomorphic operation may be performed on the ciphertext. For example, although it may differ depending on the application, a ciphertext multiplication may be a basic operation in homomorphic encryption. A multiplication between ciphertexts may be expressed by multiplications between polynomials included in the respective ciphertexts. A multiplication of two polynomials may be performed after the polynomials are transformed by integer fast Fourier transform (FFT), that is, number-theoretic transform (NTT), to reduce computational complexity.

The polynomial multiplication using NTT will be described with reference to FIG. 3. Two ciphertexts ct1 and ct2 for a multiplication operation may be transformed to Ct1 and Ct2, respectively, through NTT, which may be expressed as follows.

$$\text{NTT(ct1)} = \text{Ct1} = (A1, B1)$$

$$\text{NTT(ct2)} = \text{Ct2} = (A2, B2) \quad \text{[Equation 2]}$$

The ciphertext ct1 may be transformed through NTT to Ct1, and Ct1 may be expressed by A1 being a set of coefficients of a first polynomial corresponding to a first message and B1 being a set of coefficients of a second polynomial corresponding to a first encrypt key. Similarly, the ciphertext ct2 may be transformed through NTT to Ct2, and Ct2 may be expressed by A2 being a set of coefficients of a third polynomial corresponding to a second message and B2 being a set of coefficients of a fourth polynomial corresponding to a second encrypt key. A set of coefficients of a polynomial may include n coefficients included in the polynomial and be expressed as, for example, A={a0, a1, . . . , an−1}.

The multiplication of the two ciphertexts may be performed by NTT as a point-wise multiplication between coefficients of the polynomials constituting the two ciphertexts, and a result CR of the point-wise multiplication may be expressed as follows.

$$CR = (Ar, Br, Cr) = Ct1 * Ct2 = (A1, B1) * (A2, B2) = \quad \text{[Equation 3]}$$
$$(A1*A2, A1*B2 + B1*A2, B1*B2)$$

In Equation 3, * denotes the point-wise multiplication and may indicate a product between coefficients of the same degree in the respective polynomials.

The multiplication result CR may be expressed by Ar, Br, and Cr representing sets of coefficients of polynomials, respectively. Since the number of polynomials increases to "3" as a result of the multiplication, the number of polynomials may be reduced to "2" again through postprocessing (not shown). The multiplication result CR may be transformed to a result ciphertext cr through inverse number-theoretic transform (INTT).

In FIG. 3, the example of transforming the ciphertext through NTT and performing a point-wise multiplication thereon is illustrated. However, in some examples, the plaintext of FIG. 2 may be transformed through NTT, and a point-wise multiplication may be performed thereon. In this example, the above description may apply likewise.

Referring back to FIG. 2, in operation 240, the ciphertext on which the homomorphic operation has been performed may be decrypted to an operated plaintext. In operation 250, the operated plaintext may be decoded to an operated message.

As described above, a multiplication of two ciphertexts having polynomials may be performed as a point-wise multiplication between coefficients of the polynomials through NTT. A method for accelerating the multiplication in hardware will be described in detail hereinafter.

For ease of description, the examples have been described herein based on homomorphic encryption. However, the above description may also apply likewise to an example of a lattice-based polynomial multiplication in post-quantum cryptography (PQC).

Figure 4:
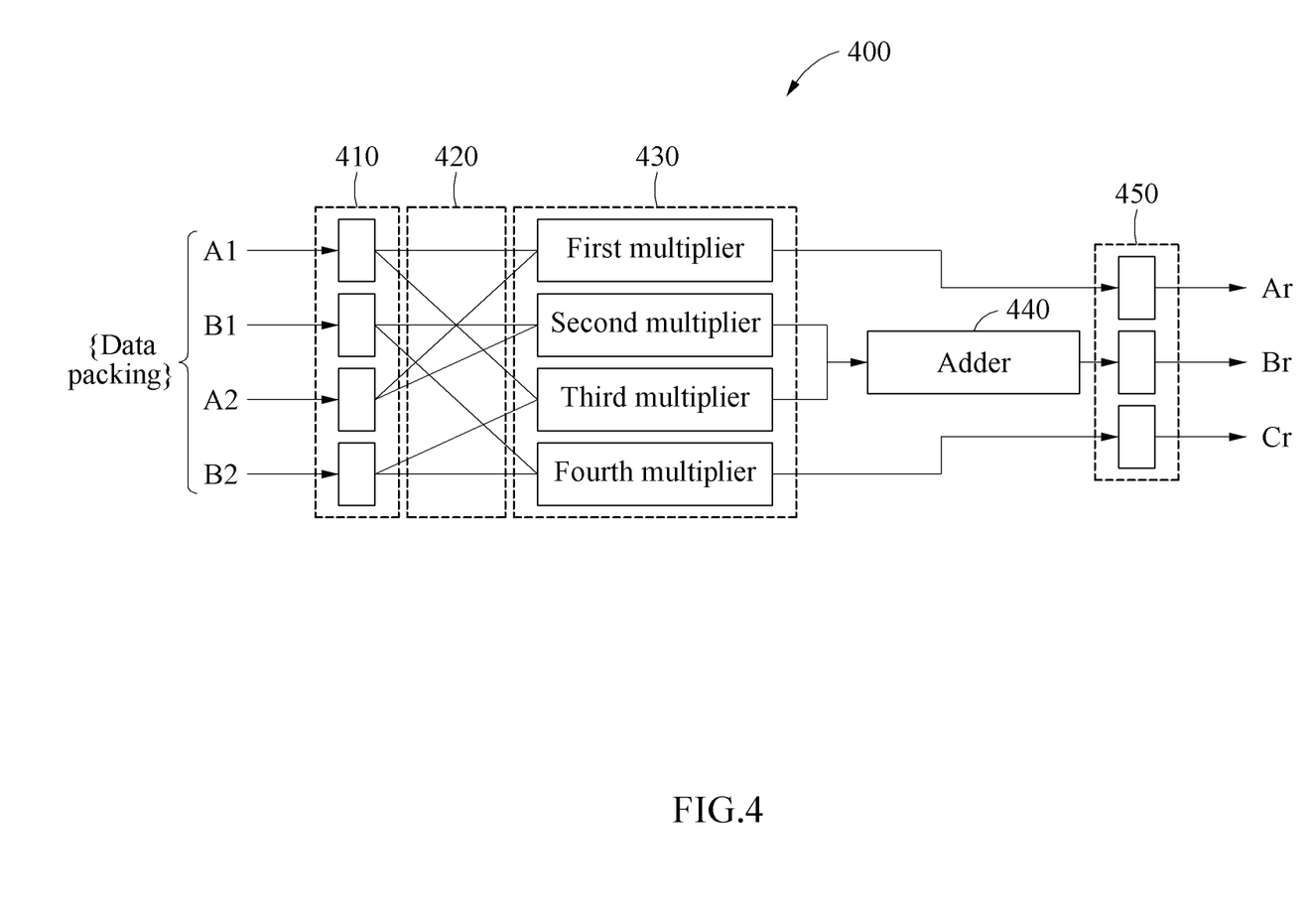
FIG. 4 illustrates an example of the operations of crypto processors.
Figure 5:
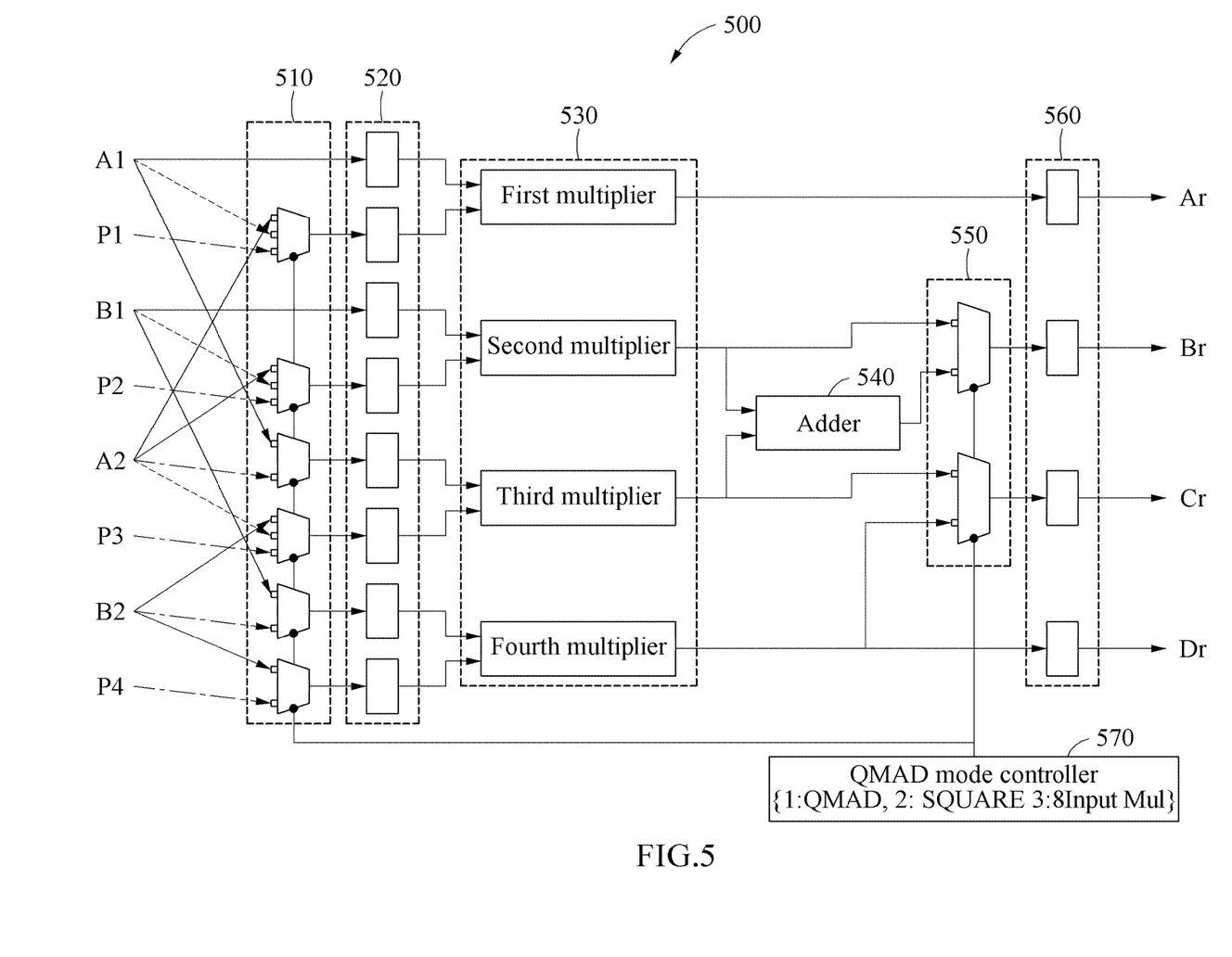
FIG. 5 illustrates an example of the operations of crypto processors.

FIGS. 4 and 5 illustrate examples of the operations of crypto processors.

Referring to FIG. 4, a crypto processor 400 may include input registers 410, multiplexers (not shown), multipliers 430, an adder 440, and output registers 450.

In order to increase an encryption level or operable level of homomorphic encryption, the degree of polynomials expressing a ciphertext may increase, leading to an increase in the memory space for coefficients of the polynomials, an increase in the number of memory accesses, and an increase in the number of operations. In addition, among operations generally performed in homomorphic encryption, ciphertext multiplication operations are frequently performed, and the operation performance may improve through parallel processing thereof based on operation units arranged based on a memory access pattern.

Each ciphertext may include two polynomials, and a multiplication of the two ciphertexts may be performed as a product of coefficients of the same degree in the respective polynomials. Coefficient sets A1 and B1 corresponding to a first ciphertext Ct1 and coefficient sets A2 and B2 corresponding to a second ciphertext Ct2 may be expressed as follows.

$$A1=\{a10, a11, a12, \ldots\}$$

$$B1=\{b10, b11, b12, \ldots\}$$

$$A2=\{a20, a21, a22, \ldots\}$$

$$B2=\{b20, b21, b22, \ldots\} \quad \text{[Equation 4]}$$

A point-wise multiplication may be performed on coefficients of the same order using the multipliers 430 and the adder 440. To this end, packing may be performed to reconfigure data input to the input registers 410 as coefficients of the same degree. For example, (a10, b10, a20, b20) may be input to the input registers 410, respectively. Then, (a11, b11, a21, b21) may start to be sequentially input to the input registers 410, respectively. Finally, (a1n−1, b1n−1, a2n−1, b2n−1) may be input to the input registers 410, respectively.

In an example, packing may be performed at a device driver terminal of a host processor. The coefficients of the same degree may be packed into operands and stored in consecutive areas of a memory. The crypto processor 400 may read out the coefficients of the same degree from the memory and store the coefficients of the same degree in the input registers 410. For example, the memory may be dynamic random-access memory (DRAM) located outside the crypto processor 400.

For example, a 4-port double data rate synchronous dynamic random access memory (DDR SDRAM) memory structure may be utilized to effectively read out the coefficients of the same degree stored in the separate areas of the memory. For example, when storing the coefficients included in the coefficient set A1 in port 1 of the DDR SDRAM, the coefficients included in the coefficient set B1 in port 2 of the DDR SDRAM, coefficients included in the coefficient set A2 in port 3 of the DDR SDRAM, and the coefficients included in the coefficient set B2 in port 4 of the DDR SDRAM, the coefficients may be sequentially stored in order by degree (e.g., ascending order or descending order). When reading out the stored coefficients, the stored coefficients may be read out sequentially, starting from a start address of each DDR SDRAM port and gradually increasing the address. If an advanced extensible interface (AXI) bus is used, multiple coefficients belonging to a single polynomial may be read out consecutively through a burst mode that may increase bus efficiency.

In addition, a stride memory patch function may be utilized to effectively read out the coefficients of the same degree stored in the separate areas of the memory. In addition, the coefficients of the same degree may be read out by accessing the memory in the form of a stride using direct memory access (DMA).

The coefficients of the same degree may be loaded to the input registers 410, respectively, and transmitted to the multipliers 430 through multiplexing 420. Referring to Equation 3, in the point-wise multiplication, four multiplication operations, that is, A1*A2, A1*B2, B1*A2, and B1*B2, may be performed. The multiplication operations may be performed by the multipliers 430, respectively. To this end, operands for each multiplication operation may be transmitted to a corresponding multiplier through multiplexing 420.

For example, A1 and A2 stored in the input registers 410 may be input to a first multiplier through multiplexing 420 to perform the operation A1*A2. Likewise, B1 and A2 may be input to a second multiplier through multiplexing 420 to perform the operation B1*A2, A1 and B2 may be input to a third multiplier through multiplexing 420 to perform the operation A1*B2, and B1 and B2 may be input to a fourth multiplier through multiplexing 420 to perform the operation B1*B2.

The result of the operation B1*A2 performed by the second multiplier and the result of the operation A1*B2 performed by the third multiplier may be transmitted to the adder 440 through an internal data path to perform an operation A1*B2+B1*A2.

The output registers 450 may store the result of the operation A1*A2 performed by the first multiplier, the result of the operation A1*B2+B1*A2 performed by the adder 440, and the result of the operation B1*B2 performed by the fourth multiplier, respectively. The operation results stored in the output registers 450 may be output as Ar, Br, and Cr of Equation 3 above, respectively. Ar, Br, and Cr may be expressed as follows.

$$Ar=\{ar0, ar1, ar2, \ldots\}$$

$$Br=\{br0, br1, br2, \ldots\}$$

$$Cr=\{cr0, cr1, cr2, \ldots\} \quad \text{[Equation 5]}$$

For example, operations performed to obtain ar0, br0, and cr0 may be expressed as follows, and coefficients of another degree may be operated in the same manner.

$$ar0=a10*a20$$

$$br0=b10*b20$$

$$cr0=a10*b20+a20*b10 \quad \text{[Equation 6]}$$

As described above, since the coefficients corresponding to the operands are transmitted to the multipliers 430 through the input registers 410 and multiplexing 420 in the crypto processor 400, unnecessary memory access may be reduced by performing only one memory access for each of the coefficients. If the coefficients of the same degree are packed, the operands may be loaded through one memory access to the packed data. In other words, the operands may be transmitted to the respective multipliers 430 even with the minimum number of input registers 410 through multiplexing 420.

In addition, by performing, in parallel through the multipliers 430, multiplication operations requiring a relatively long time compared to other operations, the time for operations performed by the crypto processor 400 may be effectively reduced.

In addition, to perform the operation A1*B2+B1*A2, the multiplication results A1*B2 and B1*A2 may be transmitted directly to the adder 440 through the internal data path, without separate memory access for the multiplication results A1*B2 and B1*A2, whereby performance degradation by the memory access may be minimized.

Although FIG. 4 illustrates multiplexing 420 is performed on the data stored in the input registers 410 for ease of description, examples are not limited thereto. As another example, multiplexing 420 may be performed on data first, the multiplexed data may be stored in the input registers 410, and each of the input registers 410 may simply transmit the stored data to each corresponding multiplier.

An instruction for the polynomial multiplication of the two ciphertexts may be defined in the instruction set architecture (ISA) including machine language instructions that are executable by the crypto processor 400, as well as in the structure of the crypto processor 400 for efficiently performing the polynomial multiplication of the two ciphertexts. For example, the instruction for the polynomial multiplication of the two ciphertexts may be referred to as quad multiplication addition (QMAD). QMAD is an integrated instruction including four multiplications and one addition, and may be expressed by microcode as shown in Table 1 below.

TABLE 1

Ct1 = (A1, B1)
Ct2 = (A2, B2)
CR = (Ar, Br, Cr)
    = (A1*A2, A1*B2 + B1*A2, B1*B2)
+++ Cipher Mult micro Code ++++++++++++++
00. QMAD Ct1, Ct2, CR // {Ct1*Ct2} → CR When the QMAD instruction, the operands Ct1 and Ct2, and the variable CR, which is the return of the operation result, are transmitted to the crypto processor 400, the operations described above may be performed, and the result of polynomial multiplication of the two ciphertexts may be returned as CR. In other words, the polynomial multiplication of the two ciphertexts may be performed with only one instruction code. Herein, for ease of description, a polynomial multiplication of two ciphertexts may also be referred to as a QMAD operation.

Referring to FIG. 5, a crypto processor 500 includes input multiplexers 510, input registers 520, multipliers 530, an adder 540, output multiplexers 550, output registers 560, and a QMAD mode controller 570.

The crypto processor 500 may further perform a square operation and an 8-input multiply operation in addition to the QMAD operation described above. The QMAD operation, the square operation, and the 8-input multiply operation may correspond to evaluators frequently used in homomorphic encryption. Although FIG. 5 illustrates the crypto processor 500 capable of selectively performing the QMAD operation, the square operation, and the 8-input multiply operation, examples are not limited thereto. The description provided herein may also apply to a crypto processor that performs one of the three operations or a combination of at least two.

The QMAD mode controller 570 may determine a type of operation to be performed by the crypto processor 500. The QMAD mode controller 570 may control the input multiplexers 510 and the output multiplexers 550 such that the determined type of operation may be performed.

For example, when a mode 1 is set by the QMAD mode controller 570, the QMAD operation described above may be performed. To this end, the input multiplexers 510 may transmit, to the input registers 520, data input along data paths indicated by solid lines in FIG. 5. In addition, among the output multiplexers 550 shown in FIG. 5, the upper multiplexer may transmit data received from the adder 540 to an output register, and the lower multiplexer may transmit data received from the fourth multiplier to an output register.

Further, when a mode 2 is set by the QMAD mode controller 570, the square operation may be performed. For example, when a ckks_square evaluator for square operation is to be performed in a Simple Encrypted Arithmetic Library (SEAL) of homomorphic encryption, the square operation may be performed.

In order to perform the square operation, the input multiplexers 510 may be controlled such that the same data may be input to each of the multipliers 530. For example, an input multiplexer may be controlled such that A1 may be transmitted to input registers connected with the first multiplier through a solid-lined data path and a dotted-lined data path starting from A1. Further, a corresponding input multiplexer may be controlled such that B1 may be transmitted to input registers connected with the second multiplier through a solid-lined data path and a dotted-lined data path starting from B1. Further, corresponding input multiplexers may be controlled such that A2 may be transmitted to input registers connected with the third multiplier through a dotted-lined data path and a dash-dotted-lined data path starting from A2. Further, corresponding input multiplexers may be controlled such that B2 may be transmitted to input registers connected with the fourth multiplier through a dash-dotted-lined data path and a solid-lined data path starting from B2.

The result of an operation A1*A1 performed by the first multiplier may be output as Ar through a corresponding output register. The output multiplexers 550 may be controlled such that the result of an operation B1*B1 performed by the second multiplier may be output as Br and the result of an operation A2*A2 performed by the third multiplier may be output as Cr. The result of an operation B2*B2 performed by the fourth multiplier may be output as Dr through a corresponding output register.

Further, when a mode 3 is set by the QMAD mode controller 570, the 8-input multiply operation may be performed. When performing the 8-input multiply operation, the crypto processor 500 may operate as a polynomial multiplier having 8 inputs. To this end, the input multiplexers 510 may transmit, to the input registers 520, data input along dash-dotted-lined data paths in FIG. 5. In FIG. 5, P1, P2, P3, and P4 may be operands of the 8-input multiply operation, in addition to A1, B1, A2, and B2. The output multiplexers 550 may operate in the same manner as in the square operation described above, and may transfer the operation results of the multipliers 530 to the respective corresponding output registers 560. Through the 8-input multiply operation, the results of point-wise multiplications of polynomial pairs corresponding to A1*P1, B1*P2, A2*P3, and B2*P4 may be output.

The adder 540 is not used for the square operation or the 8-input multiply operation.

Figure 6:
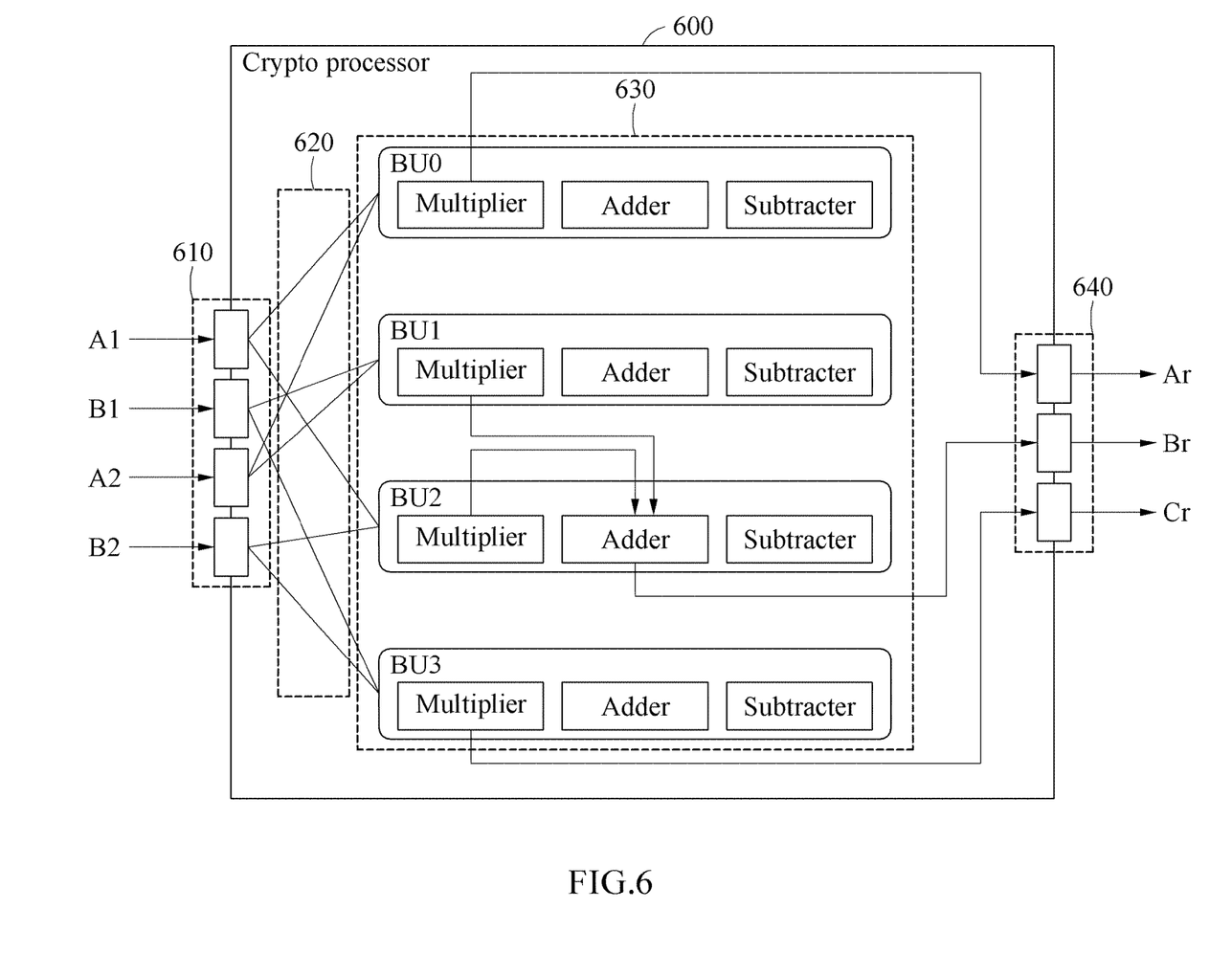
FIG. 6 illustrates an example of a crypto processor.

FIG. 6 illustrates an example of a crypto processor.

Referring to FIG. 6, a crypto processor 600 may include input registers 610, multiplexers (not shown), butterfly units (BUs) 630, and output registers 640. The crypto processor 600 may perform a QMAD operation for Ct1=(A1, B1) and Ct2=(A2, B2). Coefficients of the same degree input to the input registers 610 may be transmitted to multipliers included in the BUs 630 through multiplexing 620. The results of multiplications performed by the multipliers in BU1 and BU2 may be transmitted to an adder included in one of BU1 and BU2 through an internal data path, such that an addition of the results of multiplications may be performed. The results of operations performed by the multipliers in BU0 and BU3 and the adder in BU2 may be output as QMAD operation results, respectively. The description provided above also applies to the remaining operations, and thus a further detailed description will be omitted.

Figure 7:
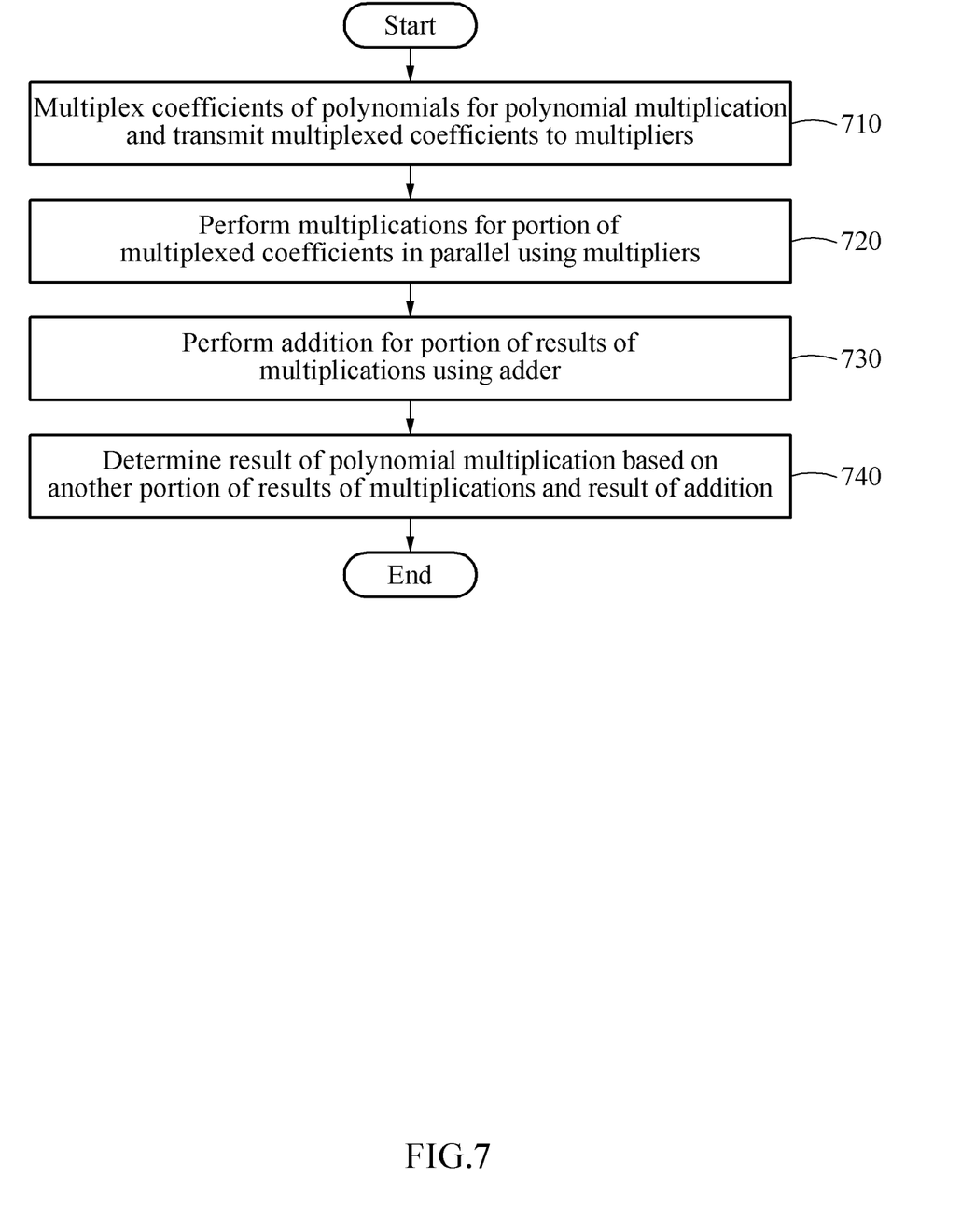
FIG. 7 illustrates an example of a method of operating a crypto processor.

FIG. 7 illustrates an example of a method of operating a crypto processor.

Referring to FIG. 7, a method of operating a crypto processor includes operation 710 of multiplexing coefficients of polynomials for a polynomial multiplication and transmitting the multiplexed coefficients to multipliers, operation 720 of performing multiplications for a portion of the multiplexed coefficients in parallel using the multipliers, operation 730 of performing an addition for a portion of results of the multiplications using an adder, and operation 740 of determining a result of the polynomial multiplication based on another portion of the results of the multiplications and a result of the addition.

According to examples, a polynomial multiplication of two ciphertexts in lattice-based homomorphic encryption (e.g., a ciphertext multiplication in residue number system (RNS)-based Cheon-Kim-Kim-Song (CKKS) homomorphic encryption scheme) may be efficiently performed through hardware acceleration. Further, an instruction for hardware acceleration may be generated, and the performance of a crypto processor that performs a polynomial multiplication in accordance with the instruction may improve. Further, the structure in which operands are transmitted to respective multipliers through multiplexing and a portion of multiplication results is transmitted to an adder through an internal data path may effectively solve the memory constraints in the crypto processor. In addition, the description provided herein may also apply to fields in which polynomial operations are performed (e.g., PQC, RNS, and the like).

The descriptions provided with reference to FIGS. 1 to 6 may apply to the operations shown in FIG. 7, and thus a further detailed description will be omitted.

Figure 8:
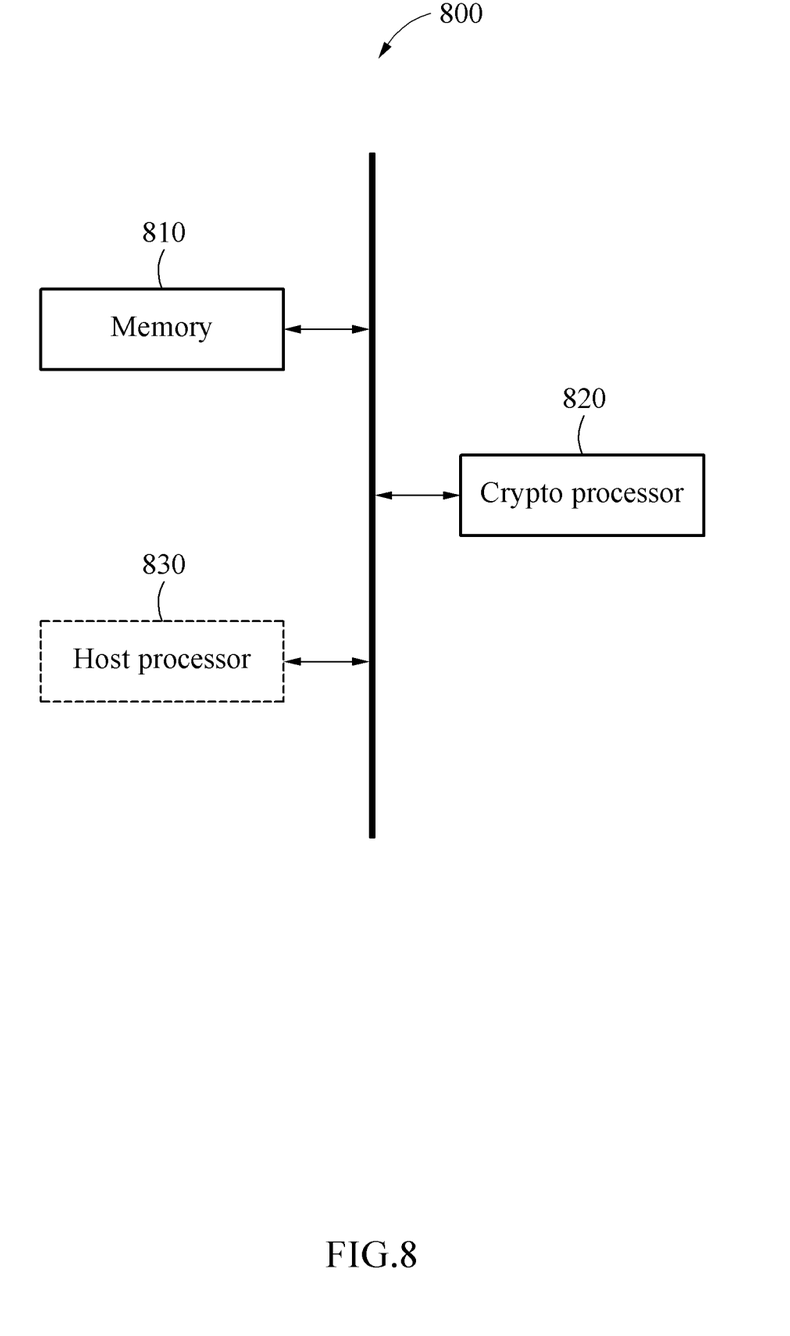
FIG. 8 illustrates an example of an electronic device.

FIG. 8 illustrates an example of an electronic device.

Referring to FIG. 8, an electronic device 800 may include a memory 810 and a crypto processor 820. In some examples, the electronic device 800 may further include a host processor 830. The memory 810, the crypto processor 820, and the host processor 830 may communicate with each other through a bus, a peripheral component interconnect express (PCIe), a network on a chip (NoC), or the like. The electronic device 800 may correspond to the server 120 of FIG. 1.

The memory 810 may store instructions for the operation of the crypto processor 820 and operands of a polynomial multiplication (e.g., polynomial coefficients, and the like). The crypto processor 820 may perform the operations described above when the instructions stored in the memory 810 are executed by the crypto processor 820. The memory 910 may include a volatile memory or a non-volatile memory.

The crypto processor 820 performs a polynomial multiplication of lattice-based texts in response to an instruction received. The crypto processor 820 multiplexes coefficients of polynomials, transmits the multiplexed coefficients to multipliers, performs multiplications for a portion of the multiplexed coefficients in parallel using the multipliers, performs an addition for a portion of results of the multiplications using an adder, and determines a result of the polynomial multiplication based on another portion of the results of the multiplications and a result of the addition. For example, the crypto processor 820 may be implemented as one of the operator units in an accelerator core unit. However, examples are not limited thereto.

The host processor 830 is a device that controls the electronic device 800 and may include, for example, a central processing unit (CPU) and/or a graphics processing unit (GPU). The host processor 830 may perform an application of homomorphic encryption (e.g., a polynomial multiplication of lattice-based texts). For example, the host processor 830 may use a homomorphic encryption library (e.g., SEAL), and the homomorphic encryption library may interface with a device driver for driving a hardware accelerator. The device driver may generate an instruction set to drive the hardware accelerator. The generated instruction set may be transmitted to the accelerator to perform the application of homomorphic encryption, and the result may be returned to the host processor 830.

In addition, the electronic device 800 may process the operations described above.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, field programmable gate arrays (FPGAs), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such a parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as compact disc read only memory (CD-ROM) discs, digital versatile disc (DVDs), and/or Blue-ray discs; magneto-optical media such as optical discs; and hardware devices that are specially configured to store and perform program instructions, such as read-only memory (ROM), random access memory (RAM), flash memory (e.g., universal serial bus (USB) flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of operating a crypto processor, the method comprising:
   encrypting input data to plural lattice-based texts;
   multiplexing coefficients of polynomials of the plural lattice-based texts, to selectively provide the multiplexed coefficients to plural multipliers; and
   generating a lattice-based text result for a homomorphic operation by operating the plural multipliers in parallel with respect to the multiplexed coefficients, including operating at least one first multiplier, of the plural multipliers, provided a first portion of the multiplexed coefficients, operating at least one second multiplier, of the plural multipliers, provided a second portion of the multiplexed coefficients, and selectively operating an adder provided some results of the operated plural multipliers.

2. The method of claim 1, wherein the some results of the operated plural multipliers are transmitted to the adder through internal data paths respectively connecting corresponding multipliers, of the plural multipliers, to the adder.

3. The method of claim 1, wherein the operating the plural multipliers includes;
   controlling the first multiplier to operate based on a first polynomial coefficient of a first text and a third polynomial coefficient of a second text;
   controlling a third multiplier, among the plural multipliers, to operate based on a second polynomial coefficient of the first text and the third polynomial coefficient;
   controlling a fourth multiplier, among the plural multipliers, to operate based on the first polynomial coefficient and a fourth polynomial coefficient of the second text; and
   controlling the second multiplier to operate with respect to the second polynomial coefficient and the fourth polynomial coefficient.

4. The method of claim 3, wherein the some results of the operated plural multipliers a result of the operating of the third multiplier and a result of the operating of the fourth multiplier.

5. The method of claim 1, further comprising:
   receiving the coefficients of the polynomials and an instruction for the generating of the lattice-based text result for the homomorphic operation,
   controlling the multiplexer and the operating of the plural multipliers based on the received instruction.

6. The method of claim 5, wherein the receiving comprises respectively receiving coefficients of a same degree, among the coefficients of the polynomials, for each of a plurality of the parallel operating of the plural multipliers.

7. The method of claim 1, wherein the plural lattice-based texts are one of plaintexts, in which respective messages to be delivered are encoded, or encrypted ciphertexts corresponding to the plaintexts.

8. The method of claim 1, wherein each of the polynomials of the plural lattice-based texts comprise:
   a first polynomial corresponding to a message; and
   a second polynomial corresponding to an encrypt key related to encryption and/or decryption of a ciphertext corresponding to the message.

9. The method of claim 1, wherein the polynomials of the plural lattice-based texts are number-theoretic transform (NTT) transformed polynomials, and
   the operating of the plural multipliers are respectively performed as a point-wise multiplication of respective coefficients of the selectively provided multiplexed coefficients.

10. A non-transitory computer-readable storage medium storing instructions that, when executed by a processor, cause the processor to perform the method of claim 1.

11. The method of claim 1, further comprising:
    controlling an operation mode of the crypto processor,
    wherein the adder is operated in response to the controlled operation mode being a first mode,
    wherein a same coefficient is provided to each of the plural multipliers, for the operating the plural multipliers, in response to the controlled operation mode being a second mode, and
    wherein different coefficients are provided to the plural multipliers, for the operating the plural multipliers, in response to the operation mode being a third mode.

12. A method of operating a crypto processor, the method comprising:
    controlling an operation mode of the crypto processor;
    encrypting input data to plural lattice-based texts; and
    generating a lattice-based text result for a homomorphic operation, selected among plural homomorphic operations based on the controlled operation mode, by operating plural multipliers in parallel with respect to coefficients of polynomials of the plural lattice-based texts and based on the controlled operation mode, including operating at least one first multiplier, of the plural multipliers, provided a first portion of the coefficients, operating at least one second multiplier, of the plural multipliers, provided a second portion of the coefficients, and selectively operating an adder provided some results of the operated plural multipliers dependent on the controlled operation mode,
    wherein the adder is operated in response to the controlled operation mode being a first mode,
    wherein a same coefficient is provided to each of the plural multipliers, for the operating the plural multipliers, in response to the controlled operation mode being a second mode, and
    wherein different coefficients are provided to the plural multipliers, for the operating the plural multipliers, in response to the operation mode being a third mode.

13. A crypto processor, the crypto processor comprising:
    an encryptor configured to encrypt input data to plural lattice-based texts;
    a multiplexer configured to multiplex coefficients of polynomials of the plural lattice-based texts, to selectively provide the multiplexed coefficients to plural multipliers,
    input registers configured to respectively store the selectively provided multiplexed coefficients;

the plural multipliers;
an adder; and
output registers configured to store a lattice-based text result for a homomorphic operation with respect to the multiplexed coefficients that is based on results of configured respective parallel operating of the plural multipliers and a result of the adder,
wherein the operating of the plural multipliers includes an operating of a first multiplier, of the plural multipliers, provided a first portion of the multiplexed coefficients, an operating of a second multiplier, of the plural multipliers, provided a second portion of the multiplexed coefficients, and a selective operating of the adder provided some results of the operated plural multipliers.

14. An electronic device, comprising:
an encryptor configured to encrypt input data to plural lattice-based texts;
a memory configured to store coefficients of polynomials of the plural lattice-based texts for a polynomial multiplication; and
a crypto processor configured to:
   multiplex the coefficients and transmit the multiplexed coefficients to plural multipliers; and
   generate a lattice-based text result for a homomorphic operation by operating the plural multipliers in parallel with respect to the multiplexed coefficients, including operating at least one first multiplier, of the plural multipliers, provided a first portion of the multiplexed coefficients, operating at least one second multiplier, of the plural multipliers, provided a second portion of the multiplexed coefficients, and operating an adder provided some results of the operated plural multipliers.

15. An electronic device, comprising:
one or more processors configured to:
   encrypt a first plaintext to a first ciphertext, which is expressed by a first polynomial including a first message and a second polynomial including a first encrypt key;
   encrypt a second plaintext to a second ciphertext, which is expressed by a third polynomial including a second message and a fourth polynomial including a second encrypt key;
   control respective generations, in parallel, of plural multiplication results based on multiplexed of coefficients of the first polynomial, the second polynomial, the third polynomial, and the fourth polynomial; and
   generate a lattice-based text result for a polynomial multiplication of the first ciphertext and the second ciphertext based on the generated plural multiplication results, including a first multiplication result generated based on a first portion of the multiplexed coefficients, a second multiplication result generated based on a second portion of the multiplexed coefficients, and selectively a summation result generated based on some of the generated plural multiplication results.

16. The electronic device of claim 15, wherein the one or more processors are configured to encode a first message to the first plaintext expressed in the form of polynomials and encode a second message to the second plaintext expressed in the form of polynomials.

17. The electronic device of claim 15, wherein the one or more processors include an adder to perform the summation, and the one or more processors are configured to directly provide the some of the generated plural multiplication results to the adder through an internal data path of the one or more processors.

18. The electronic device of claim 15, wherein the one or more processors are configured to receive a quad multiplication addition (QMAD) instruction and generate the lattice-based text result based on the QMAD instruction.

19. A method of operating a crypto processor, the method comprising:
encrypting input data to plural lattice-based texts;
selectively providing, to different multipliers of plural multipliers, coefficients of polynomials of the respective lattice-based texts for one homomorphic operation selected, based on a set operation mode, from among plural different homomorphic operations; and
generate a lattice-based result of the selected homomorphic operation by operating the plural multipliers in parallel with respect to the selectively provided coefficients, including operating at least one first multiplier, of the plural multipliers, provided a first portion of the selectively provided coefficients, operating at least one second multiplier, of the plural multipliers, provided a second portion of the selectively provided coefficients, and selectively operating an adder provided some results of the operated plural multipliers.

* * * * *